April 25, 1933.  A. A. THOMANN ET AL  1,905,015
MOTOR VEHICLE SPEEDOMETER
Filed July 30, 1930
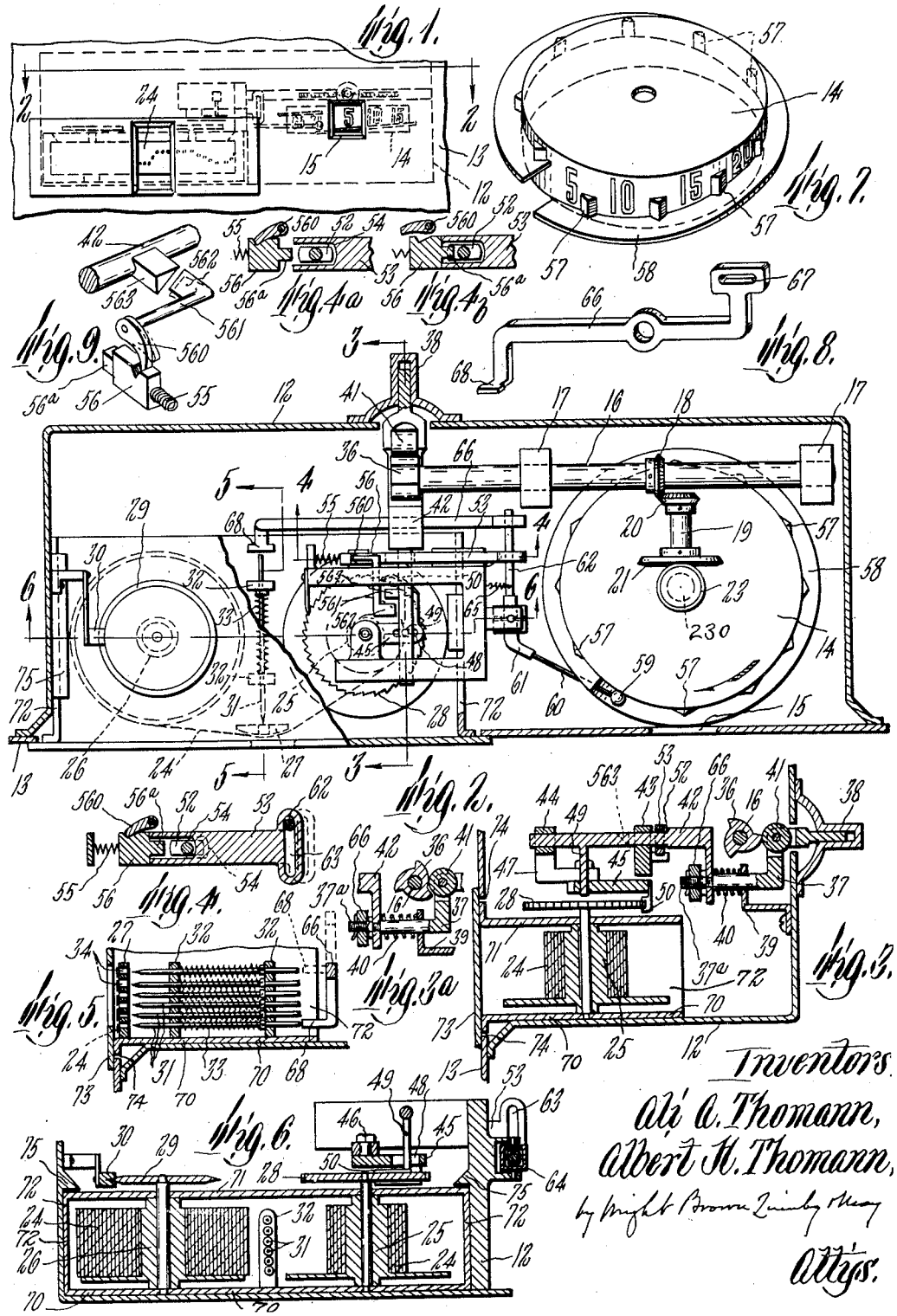
Inventors
Ali A. Thomann,
Albert H. Thomann,
Attys.

Patented Apr. 25, 1933

1,905,015

UNITED STATES PATENT OFFICE

ALOIS A. THOMANN, OF BROOKLINE, AND ALBERT H. THOMANN, OF MEDFORD, MASSACHUSETTS

MOTOR VEHICLE SPEEDOMETER

Application filed July 30, 1930. Serial No. 471,812.

This invention relates to a speedometer comprising a cylindrical dial rotatably oscillatable by the forward travel of a vehicle, to indicate varying speeds of the vehicle in a well known manner.

The object of the invention is to provide a speedometer characterized as above stated, comprising also recording means actuated by the vehicle and conditioned by the dial, to record the speed of the vehicle, so that in the event of an accident, the speed of the vehicle at the time of the accident, may be recorded, the power required to make a record being transmitted from a moving part of the vehicle and conditioned by the dial when the latter is moving to indicate speed changes, to record any speed attained by the vehicle.

The invention is embodied in a recording speedometer comprising a speed recorder including a record ribbon and a plurality of independently movable markers arranged to mark the ribbon at different distances from its edges, operating mechanism intermediate the speed recorder and a moving part of the vehicle, and adapted to be conditioned by oscillations of the dial to transmit motion to a marker, said mechanism including an adjustable conditioning member movable by the dial, so that the mechanism may be conditioned to actuate either marker, and selecting mechanism associated with the dial, and adapted to adjust the conditioning member to position causing the actuation of either marker by said operating mechanism.

Of the accompanying drawing forming a part of this specification,—

Figure 1 is a side view of a speedometer embodying the invention.

Figure 2 is a section on line 2—2 of Figure 1.

Figure 3 is a section on line 3—3 of Figure 2.

Figure 3a is a view similar to a portion of Figure 3, showing a different condition.

Figure 4 is a section on line 4—4 of Figure 2.

Figures 4a and 4b are views similar to Figure 4, showing different conditions.

Figure 5 is a section on line 5—5 of Figure 2.

Figure 6 is a section on line 6—6 of Figure 2.

Figure 7 is a perspective view of the dial provided with elements of selecting mechanism in accordance with the invention.

Figure 8 shows in perspective the conditioning member of the intermediate operating mechanism hereinafter described.

Figure 9 shows in perspective certain details hereinafter described.

The same reference characters indicate the same parts in all of the figures.

12 designates a casing which may be fixed to the instrument board 13 of a motor vehicle, 14 designates the cylindrical speedometer dial having speed-indicating characters on its periphery, which are singly visible through a sight opening 15 in the casing. The dial is rotatably oscillatable by the forward travel of the vehicle to indicate speed variations in the usual way.

A speed recorder is located in the casing and comprises a record ribbon 24, preferably of paper, and spools 25 and 26 on which the ends of the ribbon are wound, the spools supporting and permitting endwise movement of a portion of the ribbon in a predetermined path, said ribbon portion being backed by a fixed perforated guide bar 27. The spool 25 is provided with a ratchet 28, constituting an element of means for feeding the ribbon step by step.

The spool 26 is idle and rotatable by a pull of the ribbon therefrom. A brake including a disk 29, fixed to the idle spool 26, and a brake shoe 30 on a spring attached to a fixed support, maintains the ribbon under suitable tension.

The speed recorder comprises also a row of markers 31, preferably needles, movable independently in fixed guides 32, said markers being normally retracted by springs 33 from the ribbon, and projectible independently to perforate and mark the ribbon at different distances from its edges. The markers are, in this instance, projected through orifices 34 (Figure 5) in the guide bar 27.

Motion is transmitted from the vehicle to the ribbon-feeding spool 25, and the markers 31, to feed the ribbon and project the markers, by the operating mechanism next described, said mechanism being conditioned by oscillations of the dial.

The shaft is continuously rotated when the vehicle is traveling, by torque-transmitting connections between it and a wheel of the vehicle. Said connections include a shaft 230, shown by dotted lines in Figure 2, about which the dial is adapted to rotatively oscillate, the usual or any suitable means being provided, permitting the dial to rock or fluctuate in the usual way about said shaft, which is continuously rotated unidirectionally by connections (not shown) with a wheel of the vehicle, the speed or rotation of the shaft varying with that of the vehicle.

16 designates a shaft journaled in bearings 17 in the casing and provided with a multiple cam 36. Torque-transmitting connections including the elements 18, 20, 19 and 23 connect the shaft 230 with the shaft 17, to cause rotation of the cam 36.

A carrier including a member 37, movable in fixed guides 38 and 39, has a trundle roll 41, pressed by a spring 40 (Figure 3) against the cam 36. The carrier includes also a member 42, fixed to the member 37 and movable in fixed guides 43 and 44. A bell crank lever 45 is pivoted at 46 to a fixed frame member 47, and has a slot 48 receiving a stud 49 on the carrier member 42. The other arm of the lever 45 carries a pawl 50, engaging the ratchet 28. The carrier members 37 and 42 are reciprocated by the cam 36 and spring 40, and oscillate the bell crank lever 45 to cause the pawl 50 to impart a step by step rotation to the ribbon-feeding spool.

The carrier member 42 has a shoulder 52 at the junction of a wider and narrower portion thereof, as shown by Figure 3. A stop which includes a longer member 53 and a shorter member 56 is movable on fixed guides crosswise of the path of the carrier 42 by the selecting mechanism hereinafter described, to alternately prevent and permit endwise movement of the carrier.

The said stop member 53 has a slot 54 through which the shoulder 52 is movable when the bar is moved to the dotted line position shown by Figure 4. The function of the shorter stop member 56 will be presently described.

The intermediate operating mechanism includes an adjustable conditioning member 66, adapted to condition said mechanism to cause actuation of either marker 31 thereby.

The speedometer comprises selecting mechanism operable by oscillations of the dial about its axis, to render the ribbon-feeding means operative, and adjust the conditioning member 66 to cause the actuation of either marker.

Said selecting mechanism includes a row of cams 57 projecting from the periphery of the dial, and helically arranged as shown by Figure 7, one of the end cams being adjacent one edge of said periphery, and the other end cam adjacent the opposite edge. A helical flange 58 constituting a guide, is associated with the cams 57 and bears on the lower ends thereof.

The ball-shaped terminal 59 of a lever arm 60 bears on the guide 58, and on the periphery of the dial, and is adapted to be displaced outward from the position shown by Figure 2, when a cam 57 encounters it. The arm 60 is one arm of a two-armed selecting lever operable by the cams 57 and including a central or hub portion 61, and another arm 62, which extends through a slot 63 (Figure 4) in one end of the stop bar 53. The central member 61 is connected with a fixed frame member in the casing 12, by a universal joint connection, designated as a whole by 64 in Figures 2 and 6, said connection providing a fulcrum permitting a universal oscillation of the selecting lever, and constant contact of the terminal 59 thereof, with the surfaces presented by the helical guide 58 and cams 57. A spring 65 (Figure 2) connecting the lever arm 62 with the frame member, presses the terminal 59 yieldingly against the periphery of the dial, and against the guide 58 and cams 57.

The arm 60 is resilient and presses the terminal 59 against the dial. Said terminal is preferably rotatable loosely on the arm 60 to contact anti-frictionally with the dial and its cams.

The above-mentioned conditioning member 66 is a two-armed bar pivoted between its arms on an extension 37a of the carrier member 37, and freely oscillatable on said extension. One arm of the bar 66 is provided with a slot 67, receiving the arm 62 of the selecting lever. The other arm is provided with a marker-projecting ear or tappet 68, adapted to encounter a marker 31 and project the same when the carrier members 37 and 42 are moved to cause the described actuation of the ribbon-feeding spool, the bar 66 being oscillatable on the slide extension 37a by the arm 62 of the selecting lever, to locate the tappet 68 in the path of either marker.

Referring again to the shorter stop member 56, it will be seen that said member has a reduced portion 56a which is movable by a spring 55 into the slot 54 to contract the latter and arrest the slide shoulder 52, as shown by Figure 4b. A pawl 560 (Figure 9) fixed to a short rock shaft 561 is adapted to engage a notch in the member 56 and hold the latter retracted. The rock shaft is journaled in a fixed bearing and has a bevelled ear 562, adapted to cooperate with a bevelled ear on the carrier member 42.

The speed recorder is preferably supported by a slide or drawer movable into and out of the casing 12, so that the ribbon 24, the spools carrying it, and the markers 31 may be rendered conveniently accessible by removing the entire recorder from the casing.

The drawer, in this instance, includes a bottom member 70 (Figures 3, 5 and 6) slidable on the bottom of the casing, a top member 71, side members 72, and an end member 73. The spools 25 and 26 are journaled in the bottom and top members, and the marker guides 32 are fixed to the bottom member. The casing 12 is provided with an opening 74, which is covered by the end member 73, when the drawer is inserted in the casing, so that dust and moisture are excluded. The casing 12 may be provided with guides 75 (Figure 6) which prevent upward displacement of the drawer.

When the drawer is moved outward, the ratchet 28 is withdrawn from the pawl 50, the arrangement being such that the recorder is separable from the operating mechanism and is rendered operative by sliding the drawer into the casing 12.

If desired, means may be provided for locking the drawer and preventing unauthorized removal thereof.

Operation

When the arms 60 and 62 of the selecting lever are in the position shown by Figure 2, the arm 62 has moved the stop member 53 to the full line position, Figure 4, and into the path of the shoulder 52, on the slide member 43. At the same time the member 53 has moved the shorter stop member 56, so that the latter is locked by the pawl 560 in a retracted position, and the continuously rotating shaft 16 does not impart motion to the carrier members 37 and 42.

When the dial partly rotates in the direction of the arrow in Figure 2, one of the cams 57 acts on the terminal 59 of the selecting lever and moves the arm 62 of said lever to the right from the position shown by Figure 2, thus moving the stop bar 53 to the dotted line position (Figure 4), and the full line position (Figure 4a), and allowing the cam 36 to project the carrier member 42 (and with it the member 37) to the left from the position shown by Figure 3. This projection of the member 43 engages the pawl 50 with a tooth of the ratchet 28. At the same time, the lug 563 of the carrier member 42 acts on the rock-shaft lug 562 to disengage the pawl 560 from the shorter stop member 56.

The spring 40 retracts the carrier members 37 and 42 when the cam 16 encounters the trundle roll 41, so that the engagement of the pawl 50 with the ratchet causes a feed movement of the ribbon 24. During the retraction of the carrier members, the shorter stop bar 56, now released by the disengagement of the pawl 560 therefrom is pressed by the spring 55 to position locating its tongue 56a in the path of the shoulder 52, and preventing another feed movement of the ribbon, in case the terminal 59 remains displaced by a cam 57 while the dial is at rest.

It will now be seen that the longer stop bar 53 prevents feeding of the ribbon when the terminal 59 contacts with the periphery of the dial between two cams 57, and that the shorter stop bar 56 prevents feeding when the terminal 59 bears on a cam 57 which is at rest, so that the ribbon is fed only when movement of the terminal 59 is caused by a moving cam 57. After a cam 57 has passed from the terminal 59 in either direction, the several parts assume the position shown by Figure 2, and the longer stop bar 53 pushes the smaller bar 56 to the locked position shown by Figure 4.

When the marker 31 nearest one edge of the ribbon acts on the latter, record is made on the edge portion of the ribbon of a certain attained speed, for example, five miles an hour. When the next marker acts on the ribbon, record is made farther from the edge and at a different point lengthwise of the ribbon, of a greater attained speed, as twenty miles an hour, and so on, the marker nearest the opposite edge of the ribbon recording the highest speed.

If a car equipped with our recording speedometer becomes involved in an accident, the last marked portion of the ribbon may be examined for evidence as to the speed of the car at or just before the last stop thereof, and may be removed and preserved for subsequent use.

Our speedometer does not record the actual time when any mark is made on the ribbon, and therefore does not include time-indicating mechanism. The only portion of the ribbon which is likely to be useful, is that on which marks are made at or just before the time when an accident occurs.

In case the vehicle is abruptly stopped by a disabling accident, its speed at the moment of stopping is indicated by the position on the ribbon of the last mark made thereon.

Other marks previously made on the ribbon will be spaced more or less from the last mark, and are therefore readily distinguishable from the mark indicating the final speed and relied on to prove the speed at the time of an accident.

We are not limited to the specific construction shown and described and may variously modify the same within the scope of the appended claims.

We claim:

1. In a speed recording device having a ribbon feeding means controlled by a speed responsive means; a cylindrical member rotatively oscillatable by a motor vehicle at a speed determined by that of the vehicle, a plurality of independently movable markers arranged to mark the ribbon at different distances from its edges, operating mechanism for the markers including a conditioning member adapted to cause said operating mechanism to actuate any marker, and selecting mechanism operable by oscillations of the cylindrical member to adjust said conditioning member to position causing the actuation of any marker by the operating mechanism.

2. A speed recording device as specified by claim 1, said operating mechanism including an actuating shaft having a cam and driven by the vehicle, and a carrier reciprocable in fixed guides by the cam and by a spring cooperating therewith.

3. In a speed recording device having a ribbon feeding means controlled by a speed responsive means; a cylindrical member rotatively oscillatable by a motor vehicle at a speed determined by that of the vehicle, a plurality of independently movable markers arranged to mark the ribbon at different distances from its edges, operating mechanism for the markers including a conditioning member adapted to cause a predetermined marker to be actuated, and a selecting mechanism operable by oscillations of the cylindrical member to adjust said conditioning member to position causing the actuation of any marker by the operating mechanism, said selecting mechanism including a helical row of cams arranged on the periphery of the cylindrical member, a helical guide on the periphery of the cylindrical member, and a selecting lever fulcrumed on a fixed support, said lever having one end thereof bearing yieldingly on said helical guide and maintained thereby in the path of said cams, the other end of the lever being operatively connected with said conditioning member to move the same to position to actuate any one of said markers.

4. In a speed recording device having a ribbon feeding means controlled by a speed responsive means; a cylindrical member rotatively oscillatable by a motor vehicle at a speed determined by that of the vehicle, a plurality of independently movable markers arranged to mark the ribbon at different distances from its edges, operating mechanism for the markers driven by the motor vehicle, said mechanism including a shaft having a cam, a carrier reciprocable by said cam and by a spring cooperating therewith, and a conditioning member pivoted on said carrier and having a slotted arm and a tappet arm, the latter arm adapted to actuate any of said markers; and a selecting mechanism operable by oscillations of the cylindrical member and coacting with the slotted arm of the conditioning member to adjust said conditioning member to position, causing the actuation of any marker by the operating mechanism.

5. A speed recording device as specified by claim 4, said selecting mechanism including a helical row of cams arranged on the periphery of the cylindrical member, a helical guide on the periphery of the cylindrical member and a pivoted selecting lever having one end thereof bearing yieldingly on the helical guide and maintained thereby in the path of said cams, the other end of the lever being operatively connected with the slotted arm of the conditioning member to move the same to position to actuate any one of said markers.

6. In a speed recording device having a ribbon feeding means controlled by a speed responsive means; a cylindrical member rotatively oscillatable by a motor vehicle at a speed determined by that of the vehicle, a plurality of independently movable markers arranged to mark the ribbon at different distances from its edges, operating mechanism for the marks driven by the motor vehicle, said mechanism including a shaft having a cam, a carrier reciprocable by said cam and by a spring cooperating therewith, and a conditioning member pivoted on said carrier and having a slotted arm and tappet arm, the latter arm adapted to actuate any of said markers, a stop slidable on fixed guides crosswise of the path of said carrier and movable to different positions, one permitting and the other preventing movement of the carrier; and a selecting mechanism operable by oscillations of the cylindrical member and coacting with the slotted arm of the conditioning member to adjust said conditioning member to position, causing the actuation of any marker by the operating mechanism, said selecting mechanism moving the stop to any of said positions.

7. In a speed recording device having ribbon feeding means controlled by a speed responsive means; a cylindrical member rotatively oscillatable by a vehicle at a speed determined by that of the vehicle, a plurality of independently movable markers arranged to mark the ribbon at different distances from its edges; operating mechanism for the markers, said mechanism including a shaft having a cam, a carrier reciprocable by said cam and by a spring cooperating therewith, and a conditioning member pivoted on said carrier and having a slotted arm an a tappet arm, the latter adapted to actuate either of said markers, a stop slidable on fixed guides crosswise of the path of said carrier and movable to different positions, one permitting and the other preventing, movement of the carrier and selecting mechanism operable by oscillations of the cylindrical member to adjust said conditioning member to position causing the actuation of any marker by the said operating mechanism, and to move said stop to any of said positions, said selecting mechanism including a helical row of cams fixed to the periphery of the cylindrical member, a helical guide fixed to said periphery, and a two-armed selecting lever universally fulcrumed on a fixed support, one arm of said lever bearing yieldingly on said helical guide and maintained thereby in the path of said cams, and the other arm engaged with said stop and with said conditioning member, and adapted to shift the stop to any of said positions, and move the conditioning member to position to actuate any of said markers.

8. A speed recording device as specified by claim 7, an arm of said selecting lever being resilient and provided with a rounded loosely rotatable terminal, adapted to antifrictionally contact with the said helical guide and cams.

9. A speed recording device as specified by claim 7, said stop including a longer member engaged by the selecting lever and provided with a slot permitting the projection of the carrier when the stop is in one of said positons, and a shorter member movable by a spring into said slot to contract the latter and prevent the projection of the carrier when the longer member is in the other position, means being provided operable by movements of the carrier for alternately locking the shorter stop member withdrawn from said slot, and releasing it to permit its projection into the slot.

In testimony whereof we have affixed our signatures.

ALOIS A. THOMANN.
ALBERT H. THOMANN.